Figure 1:
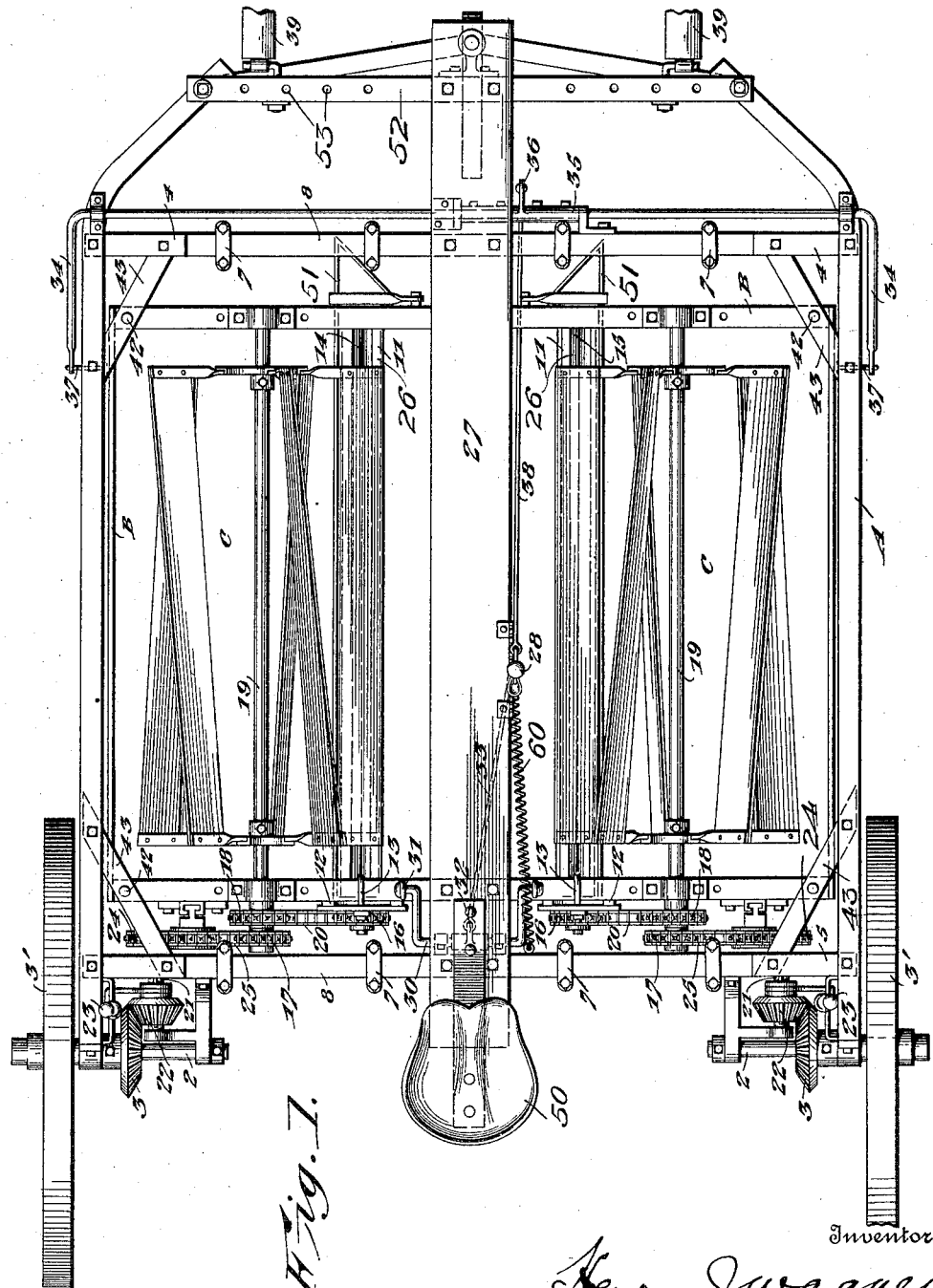

H. J. WAGNER.
INSECT EXTERMINATOR.
APPLICATION FILED DEC. 6, 1911.

1,032,255.

Patented July 9, 1912.

3 SHEETS—SHEET 1.

Witnesses
Lloyd W. Patch
A. A. Hammond

Inventor
Henry J. Wagner
By Louis Bagger
his Attorneys

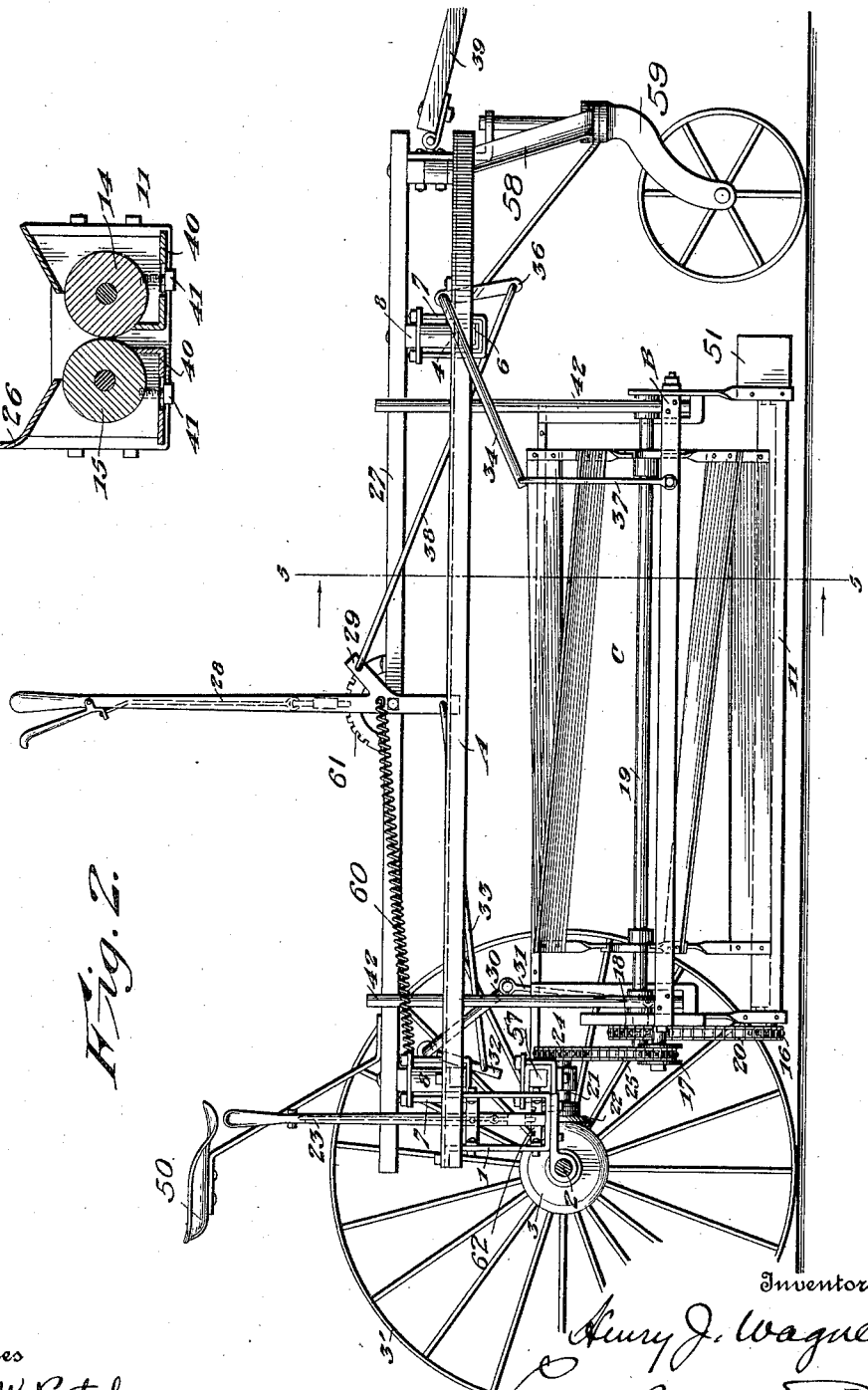

H. J. WAGNER.
INSECT EXTERMINATOR.
APPLICATION FILED DEC. 6, 1911.
1,032,255.
Patented July 9, 1912.
3 SHEETS—SHEET 3.
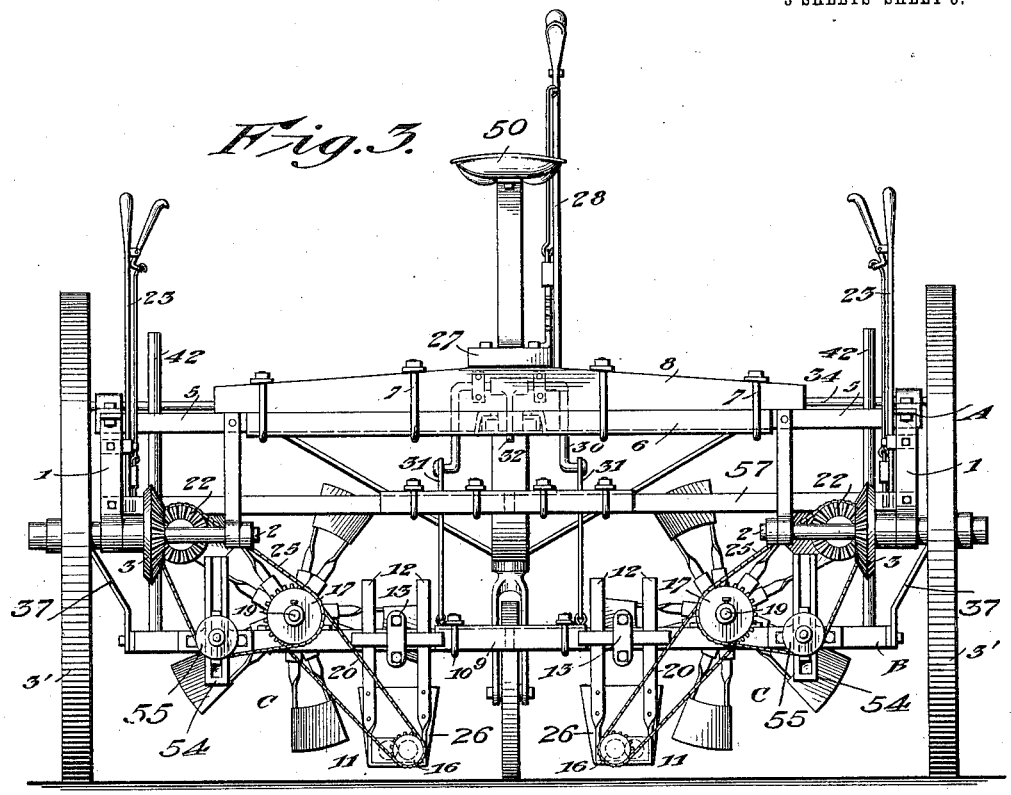
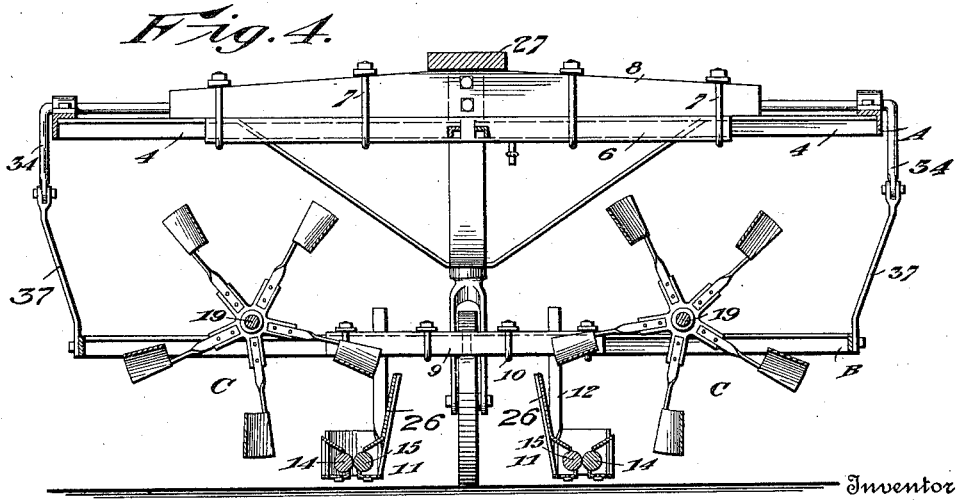

UNITED STATES PATENT OFFICE.

HENRY J. WAGNER, OF BLOOMINGTON, ILLINOIS.

INSECT-EXTERMINATOR.

1,032,255. Specification of Letters Patent. Patented July 9, 1912.

Application filed December 6, 1911. Serial No. 664,134.

*To all whom it may concern:*

Be it known that I, HENRY J. WAGNER, a citizen of the United States, residing at Bloomington, in the county of McLean and State of Illinois, have invented certain new and useful Improvements in Insect-Exterminators, of which the following is a specification.

My invention relates to an improvement in insect exterminating machines, and more particularly to machines for killing potato bugs, the object being to provide means for knocking the bugs into a trough where they are fed between rolls and crushed.

A further object is in the provision of means for extending the fan wheels and troughs so that the machine can be accommodated for removing the insects from rows of potatoes of different widths.

Another object is in the provision of means for raising the fan wheels and troughs out of the path of the vines when desired.

The invention consists in certain novel features of construction and combinations of parts which will be hereinafter described and pointed out in the claims.

In the accompanying drawings, Figure 1 is a top plan view; Fig. 2 is a view in side elevation with the near wheel removed; Fig. 3 is a rear end view; Fig. 4 is a transverse vertical sectional view on the line 3—3 of Fig. 2; and Fig. 5 is a detail sectional view through one of the troughs.

A, represents the main frame, to which are connected hangers 1, 1. Journaled in the hangers are the axles 2, upon which the wheels 3' are mounted, adapted to rotate with the axles. An extensible brace-bar 57 is connected to the hangers 1. Mounted upon the axles are bevel gears 3, 3. The front and rear bars 4, and 5, respectively, of the main frame A, are made in sections, and are connected at their ends by channel irons 6, 6, which are supported by means of clips 7, which extend over beams 8, 8, mounted upon the front and rear end bars. A secondary or fan frame B is capable of being extended, and as the ends of the frame, which is made in sections, are held together by means of channel irons 9, the channel irons being received at each end of the frame B, and connected to the sections by means of clips 10, 10. Journaled in each section of the frame B is a fan wheel C. Troughs 11, 11, are supported at their ends by posts 12 from the frame B, the posts being connected to the frame by means of clips 13. Journaled in the troughs are rolls or rollers 14 and 15. The rolls 14 are loosely mounted rolls, while the rolls 15 are driven rolls, and mounted upon the rolls 15 are sprocket wheels 16. Sprocket wheels 17 and 18 are mounted on each of the shafts 19 of the fan wheels C. A sprocket chain 20 connects the sprocket wheel 18 to the gear or sprocket wheel 16. Shoes 51 are connected to the forward ends of the troughs 11 to force any clods of earth or stones out of the path of the troughs.

The end bars 5 of the main frame A carry jack shafts 21, and splined to the jack shafts 21 are bevel gears 22, which mesh with the bevel gears 3. Levers 23 are connected to the bevel gears 22, throwing the gears in and out of engagement with the bevel gears 3. Rack-bars 62 are connected to the hangers 1 for holding levers 23 in their adjusted positions. Mounted upon the jack shafts 21 are sprocket wheels 24, which are connected to the sprocket wheels 17 by sprocket chains 25. Therefore when the machine is propelled and the gears 22 are in mesh with the gears 3, motion will be transmitted to the jack shafts 21, and power will be transmitted through the sprocket chain to the fan wheels C, and over the fan wheels to the rolls 15. The frictional engagement between the rolls 15 and 14 will cause both rolls to rotate, and upon the rotation of the fans as the machine passes along the rows of potato vines, the fans will cause the bugs to be knocked from the vines into the troughs 11, where the insects will be exterminated between the rolls. Supports 54 are connected to the frame B on which idlers 55 are slidably mounted. The idlers engage the chains 25 for holding the chains taut.

Supported by the main frame A are fenders or guards 26, which extend downward to the troughs 11, and are curved inwardly, causing the insects which are thrown against the guards or fenders to pass downward to and between the rolls 14 and 15.

Connected to the cross beams 8 is a beam 27, on which is pivotally mounted a lever 28 having an arm 29 extending at an angle therefrom. A yoke 30 is pivotally mounted on the rear beam 8, and connected to the frame B are links 31, which are pivotally connected to the yoke 30, whereby the frame is carried. An arm 32 is connected to the yoke, and connecting the arm 32 and the lower end of the lever 28 is a link 33. A toothed segment 61 is mounted on the frame A for holding the lever 28 in its adjusted positions. A spring 60 is connected to the frame A and lever 28 for normally drawing the lever rearwardly.

At the forward end of the machine is a split yoke 34, the ends of the yoke being connected together by a coupling 35, which is provided with an arm 36. The yoke 34 rests upon the main frame A, and connected to the outer terminals of the yoke are links 37, 37, which are connected to the fan frame B. A link 38 connects the arm 36 of the coupling 35 to the arm 29 of the lever 28. Upon the movement of the lever 28 the links 33 and 38 will be drawn, causing the arms 32 and 36 to be actuated whereby the yoke 30 and the coupling 35 will be rotated for either lowering or raising the frame B by the links 31 and 37. The object of having the frames A and B made in sections, and having the yoke 34 split, is to allow the machine being made of different widths to accommodate the treating of rows of potatoes which may be of various widths. In other words, in a field of potatoes the rows may be two feet apart, and another four feet, and it is therefore necessary to have the machine so constructed that the parts can be lengthened and shortened to accommodate such rows. The usual draft attachment 39 is connected to the frame for conveying the machine. A bar 52 connected to the forward end of the frame A is provided with openings 53, which openings permit the bar to be adjusted to the adjustments of the frame A. Scraping blades 40, 40, are mounted on the bottom of the troughs 11, by means of bolts 41, 41. These blades are brought into engagement with the underside of the rolls 14 and 15 to remove any of the insects which remain on the rolls, for keeping the rolls clean and unobstructed. Upright rods 42 are connected to the frame B and extend up through braces 43 of the main frame, for guiding the frame B in its vertical movements. A driver's seat 50 is mounted on the frame A. Connected to the forward end of the frame A is a hanger 58 which supports a ground wheel 59.

Having fully described my invention, what I claim as new and desire to secure by Letters Patent, is:—

1. In an insect exterminator, the combination with a main frame and a suspended frame, of axles rotatably mounted on the main frame, wheels fixed to the axles, crushing rolls carried by the suspended frame, fan wheels journaled on the suspended frame for conducting the insects to the rolls, means for transmitting motion from the axles to the fans and rolls for rotating them, yokes mounted on the main frame, independently supporting the suspended frame, a lever connected to the main frame, and means connecting the yokes to the lever whereby upon the actuation of the lever the suspended frame may be raised or lowered in a horizontal plane.

2. In an insect exterminator, the combination with a main frame and a suspended frame, of axles journaled on the main frame, wheels fixed on the axles, fans rotatably mounted on the suspended frame, troughs connected to the suspended frame, crushing rolls journaled in the troughs, sprocket wheels on a crushing roll of each trough and on the fans, sprocket chains connecting the sprocket wheels on the rolls and fans, means for transmitting motion from the axles to the fans whereby the fans and rolls will be rotated, yokes mounted on the frame independently supporting the suspended frame, a lever on the main frame, and means connecting the yokes to the lever, whereby upon the actuation of the lever the suspended frame may be raised or lowered in a horizontal plane.

3. In an insect exterminator, the combination with an extensible main and suspended frame, axles journaled on the main frame, wheels mounted on the axles, of crushing rolls and fan wheels journaled on the suspended frame, means for transmitting motion to the fans and rolls from the axles, a yoke and rock shaft mounted on the frame, links connecting the yoke and shaft to the suspended frame for supporting the suspended frame, a lever on the main frame, and means connecting the yoke and rock shaft to the lever, whereby upon the actuation of the lever the suspended frame may be raised or lowered.

In testimony whereof I affix my signature, in the presence of two witnesses.

HENRY J. WAGNER.

Witnesses:
 ARTHUR C. HAMILTON,
 EDNA H. MOORE.